US012214993B2

(12) United States Patent
Wei (10) Patent No.: US 12,214,993 B2
(45) Date of Patent: Feb. 4, 2025

(54) CONFIGURING STOPPABLE FLOOR INFORMATION SET FOR ELEVATOR CAR OF ELEVATOR SYSTEM (71) Applicant: Otis Elevator Company, Farmington, CT (US)

(72) Inventor: Lieping Wei, Shanghai (CN)

(73) Assignee: OTIS ELEVATOR COMPANY, Farmington, CT (US)

(*) Notice: Subject to any disclaimer, the term of this patent is extended or adjusted under 35 U.S.C. 154(b) by 1450 days.

(21) Appl. No.: 16/715,558

(22) Filed: Dec. 16, 2019

(65) Prior Publication Data
US 2020/0307952 A1 Oct. 1, 2020

(30) Foreign Application Priority Data

Mar. 27, 2019 (CN) .......................... 201910237073.5

(51) Int. Cl.
*B66B 1/46* (2006.01)
*B66B 1/34* (2006.01)
(Continued)

(52) U.S. Cl.
CPC ............ *B66B 1/468* (2013.01); *B66B 1/3461* (2013.01); *H04W 4/029* (2018.02); *H04W 4/33* (2018.02);
(Continued)

(58) Field of Classification Search
CPC . B66B 1/468; B66B 1/3461; B66B 2201/103; B66B 2201/4615;
(Continued)

(56) References Cited

U.S. PATENT DOCUMENTS 9,418,531 B2 8/2016 Basalamah et al.
9,733,091 B2 8/2017 Kordari et al.
(Continued)

FOREIGN PATENT DOCUMENTS

CN 104581618 A 4/2015
CN 105430603 A 3/2016
(Continued)

OTHER PUBLICATIONS

Chinese Office Action for Application No. 201910237073.5; Issued Sep. 14, 2022; 12 Pages.
(Continued)

*Primary Examiner* — Jeffrey Donels
(74) *Attorney, Agent, or Firm* — CANTOR COLBURN LLP (57) ABSTRACT Configuring stoppable floor information set for an elevator cabin of an elevator system. The elevator system of the present invention comprises an elevator cabin, an elevator control device and a wireless signal module which is configured to wirelessly receive a request of registering a destination floor from a passenger's personal mobile terminal and send a corresponding destination floor of the elevator cabin to the elevator control device based on the request of registering the destination floor; wherein the wireless signal module is further configured to obtain landing floor information corresponding to the elevator cabin from the elevator system, and the elevator system configures an stoppable floor information set corresponding to the elevator cabin based on the obtained landing floor information through a handheld terminal and/or the wireless signal module. The stoppable floor information set configured in the present invention is accurate.

19 Claims, 6 Drawing Sheets (51) Int. Cl.
  *H04W 4/029* (2018.01)
  *H04W 4/33* (2018.01)
(52) U.S. Cl.
  CPC . *B66B 2201/103* (2013.01); *B66B 2201/4615* (2013.01); *B66B 2201/4653* (2013.01)
(58) Field of Classification Search
  CPC . B66B 2201/4653; B66B 1/14; B66B 1/3415; B66B 3/02; H04W 4/029; H04W 4/33
  See application file for complete search history.

(56) References Cited

U.S. PATENT DOCUMENTS

| | | | |
|---|---|---|---|
| 9,788,167 | B2 | 10/2017 | Geng et al. |
| 10,028,105 | B1 | 7/2018 | Swart |
| 10,046,947 | B2 | 8/2018 | Haipus |
| 10,098,074 | B2 | 10/2018 | Baker et al. |
| 10,206,068 | B2 | 2/2019 | Cerchio et al. |
| 2017/0010099 | A1 | 1/2017 | Simcik |
| 2018/0162688 | A1* | 6/2018 | Troesch ............... B66B 1/468 |
| 2018/0370758 | A1* | 12/2018 | Huang ................. B66B 1/50 |
| 2019/0023527 | A1* | 1/2019 | Larmuseau ........... B66B 1/3461 |
| 2019/0168994 | A1* | 6/2019 | Li ......................... H04W 4/20 |
| 2019/0193989 | A1* | 6/2019 | Huang .................. B66B 1/468 |
| 2019/0263627 | A1* | 8/2019 | Huang .................. H04W 4/80 |

FOREIGN PATENT DOCUMENTS

| | | | | |
|---|---|---|---|---|
| CN | 105898692 | A | 8/2016 | |
| CN | 106153049 | A | 11/2016 | |
| CN | 106658383 | A | 5/2017 | |
| CN | 106878933 | A | 6/2017 | |
| CN | 107356256 | A | 11/2017 | |
| CN | 107416620 | A | 12/2017 | |
| CN | 109110601 | A | 1/2019 | |
| CN | 109502435 | A | 3/2019 | |
| EP | 3505476 | A1 * | 7/2019 | ............... B66B 1/14 |
| WO | 02059029 | A1 | 8/2002 | |
| WO | 2016198548 | A1 | 12/2016 | |

OTHER PUBLICATIONS

European Search Report for Application No. 19215983.8, Issued Jul. 20, 2020, 8 Pages.

Pesic, Sasa, et al., "Bluetooth Low Energy Microlocation Asset Tracking (BLEMAT) in a Context-Aware Fog Computing System", WIMS Jun. 25-27, 2018, Novi Sad, Serbia, 11 pages.

Teran, Marco, et al., "WLAN-BLE Based Indoor Positioning System using Machine Learning Cloud Services", Conference Paper, ResearchGate, Nov. 2018, 7 pages.

* cited by examiner

CONFIGURING STOPPABLE FLOOR INFORMATION SET FOR ELEVATOR CAR OF ELEVATOR SYSTEM

CROSS-REFERENCE TO RELATED APPLICATION

This application claims priority from Chinese patent application 201910237073.5, filed on Mar. 27, 2019, the entirety of which is hereby incorporated by reference herein and forms a part of the specification.

FIELD OF THE INVENTION

The present invention pertains to the technical field of elevator, and it relates to configuring corresponding stoppable floor information set for an elevator cabin of an elevator system.

BACKGROUND OF THE INVENTION

In order to improve the experience of passengers, a wireless signal module is installed in the elevator system to interact with personal mobile terminals carried by passengers, so as to realize functions like automatically calling the elevator, such as automatically registering destination floors.

In practical application, elevator cabins of different elevator systems may have different stoppable floors, even the elevator cabins of the same elevator system may still have different stoppable floors, for example, in different application scenarios and/or under different scheduling strategies, the stoppable floors of the elevator cabins may be different, or may be adjusted and changed. For a personal mobile terminal used for calling elevators, if the stoppable floor information set corresponding to a certain elevator cabin is inconsistent with the actually stoppable floors of the elevator cabin, elevator calling error or failure will be incurred, for example, the elevator cabin cannot land at the destination floor which the personal mobile terminal has automatically requested to register.

Therefore, the stoppable floor information set is the basic information to realize the function of automatically calling elevators.

SUMMARY OF THE INVENTION

According to a first aspect of the present invention, an elevator system is provided, which comprises: an elevator cabin; an elevator control device configured to at least control the elevator cabin to move in an elevator shaft and land at each stoppable floor; and a wireless signal module configured to wirelessly receive a request of registering a destination floor from a passenger's personal mobile terminal and send a corresponding destination floor of the elevator cabin to the elevator control device based on the request of registering the destination floor; wherein the wireless signal module is further configured to obtain landing floor information corresponding to the elevator cabin from the elevator system, and the elevator system configures a stoppable floor information set corresponding to the elevator cabin based on the obtained landing floor information through a handheld terminal and/or the wireless signal module.

The elevator system according to an embodiment of the present invention, wherein the elevator system is provided with a corresponding storage end which stores the stoppable floor information set corresponding to the elevator cabin.

The elevator system according to another embodiment or any of the above embodiments of the present invention, wherein the storage end provides the stoppable floor information set corresponding to the elevator cabin which can be downloaded and acquired by the personal mobile terminal; wherein the personal mobile terminal is configured to sense wireless signals broadcast by the wireless signal module and establish a wireless connection with the wireless signal module, and to automatically send the request of registering the destination floor to the wireless signal module based on the stoppable floor information set.

The elevator system according to still another embodiment or any of the above embodiments of the present invention, wherein the wireless signal module is further configured to send the landing floor information to the handheld terminal; the elevator system determines the landing floor information as stoppable floor object corresponding to the elevator cabin through the handheld terminal which can establish wireless connection with the wireless signal module, and builds the stoppable floor information set corresponding to the elevator cabin through the handheld terminal, wherein an element of the stoppable floor information set includes the stoppable floor object.

The elevator system according to still another embodiment or any of the above embodiments of the present invention, wherein the elevator system wirelessly sends the stoppable floor information set to the storage end through the handheld terminal which has established wireless connection with the wireless signal module.

The elevator system according to still another embodiment or any of the above embodiments of the present invention, wherein the wireless signal module is further configured to automatically build the stoppable floor information set corresponding to the elevator cabin based on the obtained landing floor information.

The elevator system according to still another embodiment or any of the above embodiments of the present invention, wherein the wireless signal module is further configured to send the stoppable floor information set to the handheld terminal; wherein, the elevator system wirelessly sends the stoppable floor information set to the storage end through the handheld terminal.

The elevator system according to still another embodiment or any of the above embodiments of the present invention, wherein the storage end is a cloud server or is arranged in the wireless signal module.

The elevator system according to still another embodiment or any of the above embodiments of the present invention, wherein the elevator system comprises: a first Bluetooth module installed in the elevator cabin, which is used for broadcasting a first Bluetooth signal and automatically establishing a first Bluetooth connection with the personal mobile terminal based on the first Bluetooth signal, and receiving the request of registering the destination floor sent from the personal mobile terminal upon establishment of the first Bluetooth connection; and a second Bluetooth module installed in a landing station area, which is used for broadcasting a second Bluetooth signal and automatically establishing a second Bluetooth connection with the personal mobile terminal based on the second Bluetooth signal, and receiving an elevator call request about an elevator moving direction sent from the personal mobile terminal upon establishment of the second Bluetooth connection; wherein, the wireless signal module is the first Bluetooth module.

The elevator system according to still another embodiment or any of the above embodiments of the present invention, wherein the wireless signal module is further configured to monitor changes of the information of actually stoppable floors of the elevator cabin compared to the existing or configured stoppable floor information set.

According to a second aspect of the present invention, a handheld terminal is provided, which comprises a memory, a processor and a computer program stored in the memory and executable on the processor, the processor implementing the following steps when executing the computer program: receiving landing floor information from the wireless signal module wirelessly connected with the handheld terminal, wherein the landing floor information is corresponding to landing floor when an elevator cabin lands at each stoppable floor; determining the landing floor information as stoppable floor object of the corresponding elevator cabin; building a landing floor information set corresponding to the elevator cabin, wherein an element of the stoppable floor information set includes the stoppable floor object; and sending the stoppable floor information set wirelessly to the storage end.

According to a third aspect of the present invention, there is provided a computer-readable storage medium on which a computer program is stored, wherein the computer program can be executed by a processor to realize the following steps: receiving landing floor information from the wireless signal module wirelessly connected with the handheld terminal, wherein the landing floor information is corresponding to landing floor when an elevator cabin lands at each stoppable floor; determining the landing floor information as stoppable floor object of the corresponding elevator cabin; building a landing floor information set corresponding to the elevator cabin, wherein an element of the stoppable floor information set includes the stoppable floor object; and sending the stoppable floor information set wirelessly to the storage end.

According to a fourth aspect of the present invention, a method of configuring an stoppable floor information set for an elevator cabin of an elevator system is provided, which includes the steps of: in the process that the elevator cabin moves in an elevator shaft and lands at each stoppable floor, obtaining the corresponding landing floor information through a wireless signal module of the elevator system; and configuring an stoppable floor information set corresponding to the elevator cabin based on the obtained landing floor information; wherein, the wireless signal module is configured to wirelessly receive a request of registering a destination floor from a passenger and send a corresponding destination floor of the elevator cabin to the elevator system based on the request of registering the destination floor.

The method according to an embodiment of the present invention, wherein the step of configuring the stoppable floor information set corresponding to the elevator cabin includes updating the stoppable floor information set corresponding to the elevator cabin based on the landing floor information.

The method according to another embodiment or any of the above embodiments of the present invention, wherein an element of the stoppable floor information set includes the stoppable floor object corresponding to the landing floor information; in the step of configuring the stoppable floor information set corresponding to the elevator cabin, if the landing floor information does not correspond to the stoppable floor object of the existing stoppable floor information set, it will be added as stoppable floor object into the existing stoppable floor information set so as to form an updated stoppable floor information set corresponding to the elevator cabin.

The method according to still another embodiment or any of the above embodiments of the present invention, wherein the element of the stoppable floor information set includes the stoppable floor object corresponding to the landing floor information; in the step of configuring the stoppable floor information set corresponding to the elevator cabin, after the elevator cabin has landed at each stoppable floor, if a certain stoppable floor object in the existing stoppable floor information set could not correspond to any of the landing floor information obtained by the wireless signal module, it will be deleted from the existing stoppable floor information set so as to form an updated stoppable floor information set corresponding to the elevator cabin.

The method according to still another embodiment or any of the above embodiments of the present invention, wherein the step of configuring the stoppable floor information set corresponding to the elevator cabin includes: sending the landing floor information to the handheld terminal through the wireless signal module of the elevator system; determining the landing floor information as the stoppable floor object corresponding to the elevator cabin through the handheld terminal; building the stoppable floor information set corresponding to the elevator cabin through the handheld terminal, wherein the element of the stoppable floor information set includes the stoppable floor object; and sending the stoppable floor information set wirelessly to the storage end through the handheld terminal.

The method according to still another embodiment or any of the above embodiments of the present invention, wherein the step of configuring the stoppable floor information set corresponding to the elevator cabin includes: automatically building the stoppable floor information set corresponding to the elevator cabin through the wireless signal module of the elevator system; sending the stoppable floor information set to the handheld terminal through the wireless signal module of the elevator system; and sending the stoppable floor information set wirelessly to the storage end through the handheld terminal, wherein the step of configuring the stoppable floor information set corresponding to the elevator cabin includes: automatically building the stoppable floor information set corresponding to the elevator cabin through the wireless signal module of the elevator system; sending the stoppable floor information set to the handheld terminal through the wireless signal module of the elevator system; and sending the stoppable floor information set wirelessly to the storage end through the handheld terminal.

The method according to still another embodiment or any of the above embodiments of the present invention, wherein the storage end stores the stoppable floor information set corresponding to the elevator cabin, and provides the stoppable floor information set corresponding to the elevator cabin which can be downloaded and acquired by the personal mobile terminal; wherein, the personal mobile terminal is configured to sense wireless signals broadcast by the wireless signal module and establish a wireless connection with the wireless signal module, and to automatically send the request of registering the destination floor to the wireless signal module based on the stoppable floor information set.

The method according to still another embodiment or any of the above embodiments of the present invention, wherein the storage end is a cloud server or is arranged in the wireless signal module.

The method according to still another embodiment or any of the above embodiments of the present invention, wherein the stoppable floor information set includes a set of upward stoppable floors information and/or a set of downward stoppable floors information; the set of upward stoppable floors information/set of downward stoppable floors information is obtained through the following steps: the elevator cabin moving upward/downward in the elevator shaft and landing at each upward/downward stoppable floor; obtaining the corresponding landing floor information by the wireless signal module of the elevator system; and configuring the set of upward stoppable floors information/the set of downward stoppable floors information corresponding to the elevator cabin based on the obtained landing floor information.

The above features and operations of the present invention will become more obvious from the following descriptions and drawings.

BRIEF DESCRIPTION OF THE DRAWINGS

The above and other objects and advantages of the present invention will become clearer and more complete from the following detailed descriptions given in conjunction with the drawings, wherein the same or similar elements are denoted by the same reference sign.

DETAILED DESCRIPTION OF THE EMBODIMENTS OF THE INVENTION

The present invention will now be described more fully with reference to the accompanying drawings, which show exemplary embodiments of the present invention. However, the present invention can be implemented in many different forms and should not be construed as being limited to the embodiments described herein. Conversely, the embodiments are merely provided for making the present disclosure thorough and complete and for fully conveying the concept of the present invention to those skilled in the art.

Some of the block diagrams shown in the drawings are functional entities and do not necessarily correspond to physically or logically independent entities. These functional entities may be implemented in software form, or in one or more hardware modules or integrated circuits, or in different processing devices and/or micro-controller apparatus.

In this application, for the convenience of description, "a method of configuring a stoppable floor information set for an elevator cabin of an elevator system" is referred to as "a method of configuring a set of the stoppable floor information".

Figure 1:
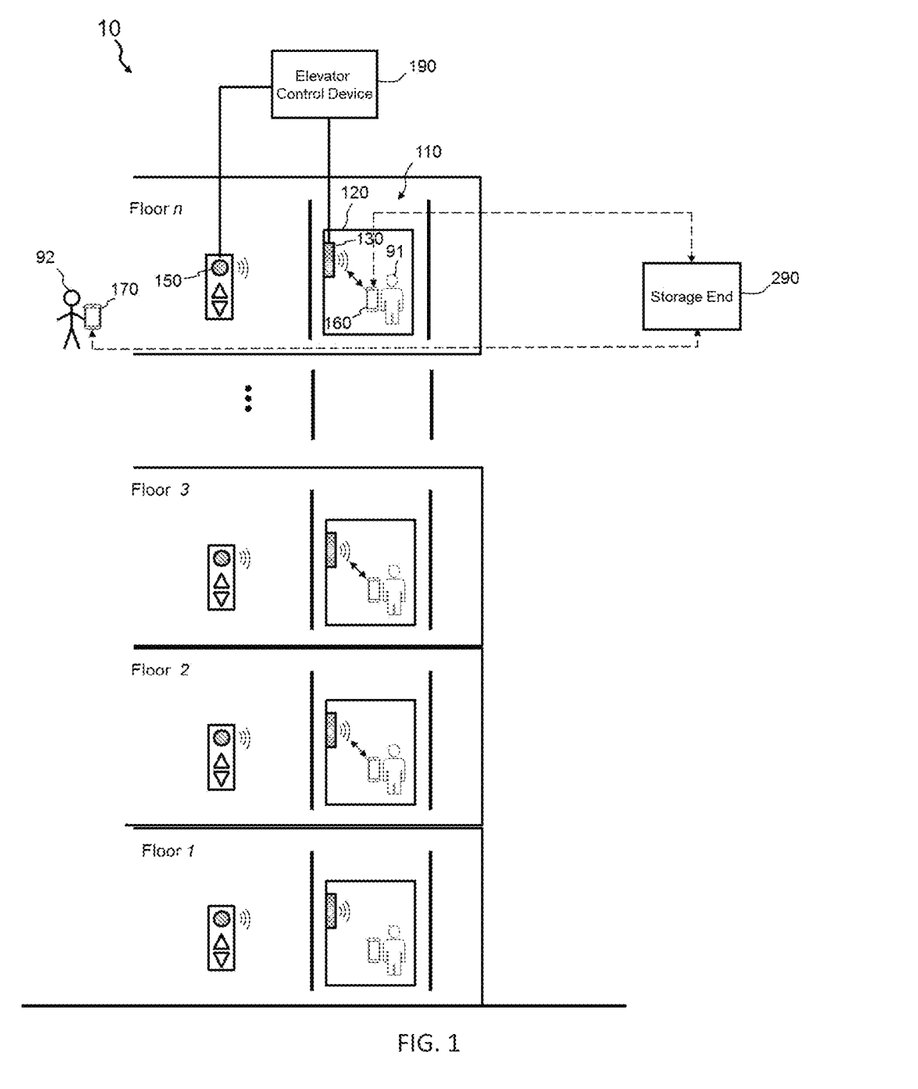
FIG. 1 is a schematic diagram of an elevator system according to an embodiment of the present invention.
Figure 2:
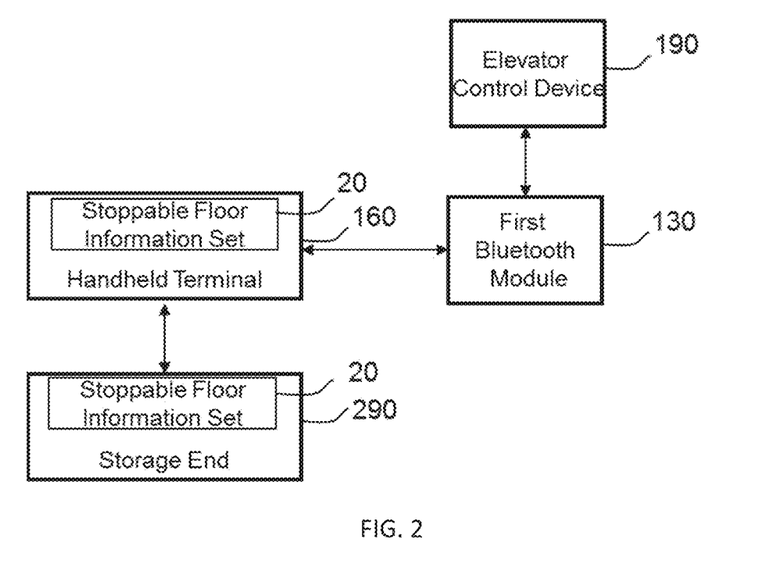
FIG. 2 is a working principle diagram of the elevator system according to an embodiment of the present invention.
Figure 3:
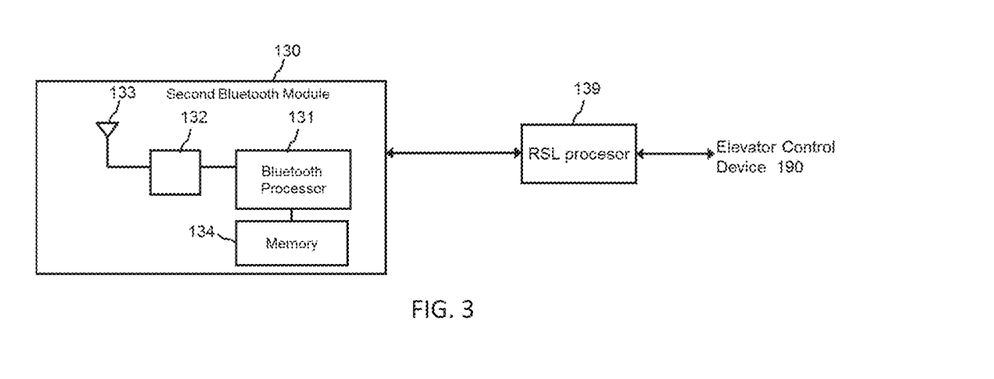
FIG. 3 is a schematic diagram of a wireless signal module of the elevator system according to an embodiment of the present invention.
Figure 4:
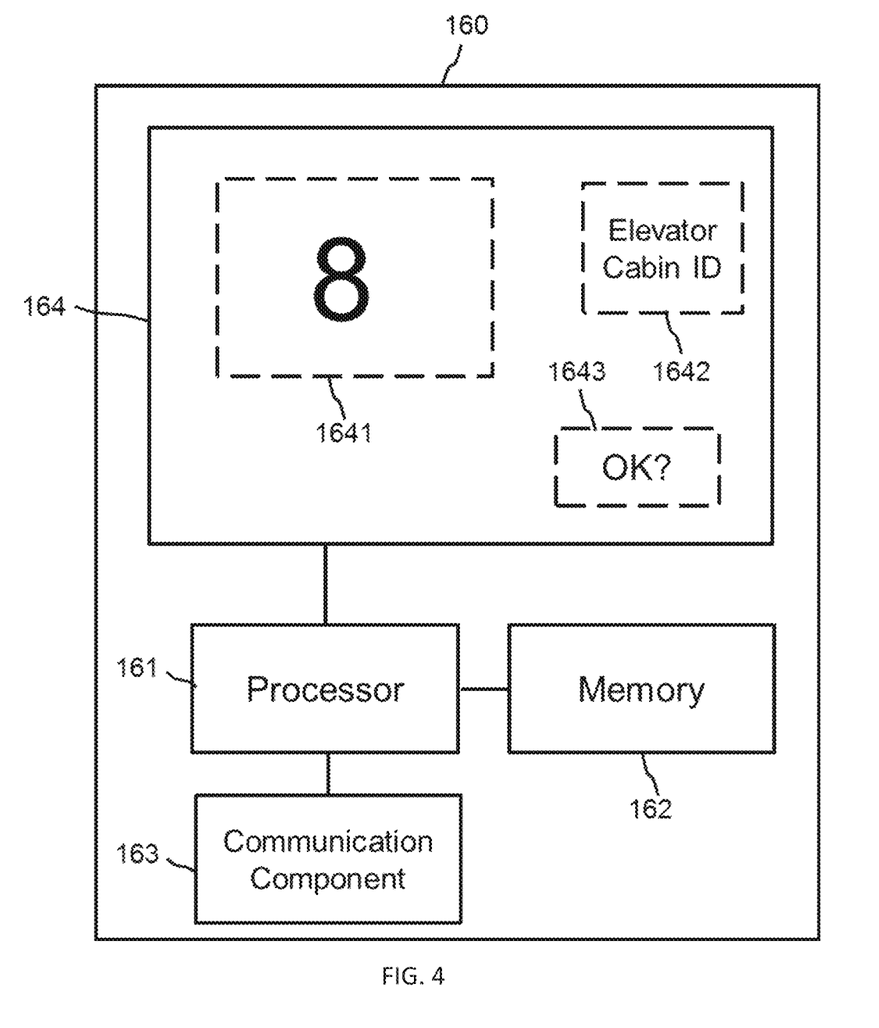
FIG. 4 is a schematic diagram of a handheld terminal according to an embodiment of the present invention.

FIG. 1 is a schematic diagram of an elevator system according to an embodiment of the present invention; FIG. 2 is a working principle diagram of the elevator system according to an embodiment of the present invention; FIG. 3 is a schematic diagram of a wireless signal module of the elevator system according to an embodiment of the present invention; FIG. 4 is a schematic diagram of a handheld terminal according to an embodiment of the present invention. Now the elevator system, handheld terminal, etc. of the embodiments of the present invention will be illustrated in combination with FIG. 1 to FIG. 4

Referring to FIG. 1, an elevator system 10 is installed in a building in which transportation of passengers and/or materials up and down is necessary. An elevator shaft 110 of the elevator system 10 and multiple floors, e.g. floor 1, floor 2 to floor n (n being an integer greater than or equal to 2), are correspondingly set in the building.

As shown in FIG. 1, the elevator system 10 includes an elevator control device 190 and one or more elevator cabins 120, which are used to carry passengers and the like to move in the elevator shaft 110, so as to transport passengers from one floor to another. The elevator control device 190 can be a control center of the elevator system 10, which, for example, can realize various functions such as driving and controlling the elevator cabin 120, scheduling the elevator cabin 120, etc., and the specific setting form of the elevator control device 190 is not restrictive. In order to describe the improvements made in the present invention in a clear and concise manner, the driving parts, traction parts and other conventional parts included in the elevator system 10 are not shown and described in the drawings.

The elevator cabin 120 does not land at every floor of the building. For example, when moving up, the elevator cabin 120 does not land at floor 2 and floor 3, and when moving down, it does not land at floor 2. It will be understood that the specific non-landing floor can be determined in advance according to the situation in the building, the elevator group control scheduling management strategy and other factors, for example, when floor m is a dummy landing station (or "blind floor"), the elevator cabin certainly could not land at this floor m; it will also be understood that different elevator cabins 120 (e.g. different elevator cabins in the same elevator system 10) may have different landing strategies correspondingly, i.e. they may be arranged to have different stoppable floors; in the embodiments below, different stoppable floor information sets 20 can be configured for different elevator cabins 120; moreover, each elevator cabin 120 can be assigned with a corresponding ID (such as a unique identifier), so that different elevator cabins can be distinguished from each other, and the ID can also be used in the process of configuring the stoppable floor information set to make the stoppable floor information set correspond to the respective elevator cabins.

Referring to FIG. 1 and FIG. 2, the elevator control device 190 is configured to at least control the elevator cabin 120 to move in the elevator shaft 110 and land at each stoppable floor, for example, the elevator control device 190 can control the elevator cabin 120 to move upward and land at each stoppable floor, and/or control the elevator cabin 120 to move downward and land at each stoppable floor.

Refer to FIG. 1 and FIG. 2, the elevator system 10 is also equipped with a plurality of wireless signal modules, which are used to realize the function of automatically calling elevators. In one embodiment, the wireless signal module includes a first Bluetooth module 130 installed in the elevator cabin 120, which can be used to broadcast a first Bluetooth signal, for example, to broadcast the first Bluetooth signal that can at least cover the inside of the elevator cabin 120; the wireless signal module also includes a second Bluetooth module 150 installed in the landing station area, which can be used to broadcast the second Bluetooth signal in the landing station area. The second Bluetooth module 150 can be integrated in an elevator call request input device of the elevator system 10, wherein the elevator call request input device can be installed on both sides of an elevator door at the elevator landing station area, and call buttons such as "up" or "down" can be set on the elevator call request input device, so that elevator call requests can be manually input on the elevator call request input device. The first Bluetooth module 130 can be integrated in a destination floor registration control board inside the elevator cabin 120. The specific setting modes of the first Bluetooth module 130 and the second Bluetooth module 150 are not limited to the above examples.

The first Bluetooth module 130 and the second Bluetooth module 150 can both interact with a personal mobile terminal 170. The personal mobile terminal 170 can be installed with corresponding application components (e.g. APPs) to automatically realize corresponding functions, for example, automatically sending elevator call requests about the elevator call direction (such as "upward" elevator call request or "downward" elevator call request) when entering the landing station area, and automatically sending requests of registering the destination floor when entering the elevator cabin 120. Correspondingly, the first Bluetooth module 130 automatically establishes a first Bluetooth connection with the personal mobile terminal 170 (for example, when the passenger basically enters the elevator cabin 120) based on the first Bluetooth signal, and receives the request of registering the destination floor sent from the personal mobile terminal 170 after establishing the first Bluetooth connection; the second Bluetooth module 150 can automatically establish a second Bluetooth connection with the personal mobile terminal 170 and receive the elevator call request about the elevator call direction sent from the personal mobile terminal 170 after the second Bluetooth connection is established. Therefore, a passenger 90 can use the carried personal mobile terminal 170 to perform the elevator call operation automatically or in a hand-free manner, which greatly improves the passenger's experience in the elevator call operation.

Still referring to FIG. 1, the first Bluetooth module 130 and the second Bluetooth module 150 can both establish communication connection with the elevator control device 190, so that either of them can conveniently obtain, from the elevator control device 190, the current floor information of the elevator cabin 120, including the landing floor information m when the elevator cabin 120 lands at, for example, floor m (m being less than or equal to n). The way in which the elevator control device 190 obtains the floor information is not restrictive, nor is the way of communication connection between the first Bluetooth module 130 or the second Bluetooth module 150 and the elevator control device 190.

In one embodiment, the first Bluetooth module 130 installed inside the elevator cabin 120 is used to obtain the landing floor information corresponding to the elevator cabin 120; therefore, the elevator control device 190 controls the elevator cabin 120 to land at each stoppable floor, and the first Bluetooth module 130 can obtain all the landing floor information of the elevator cabin 120. The obtained landing floor information can be used to configure the stoppable floor information set 20 of the elevator cabin 120.

Specifically, the first Bluetooth module 130 and the second Bluetooth module 150 may be Bluetooth Low Energy (BLE) modules, which can broadcast BLE signals, respectively. It shall be understood that the wireless signal modules in the elevator system 10 are not limited to the Bluetooth modules in the above examples, but they can also be other types of wireless beacons, for example.

Still referring to FIG. 1, a person 91 (e.g. maintenance personnel 91) inside the elevator cabin 120 can enter the elevator cabin 120 with a handheld terminal 160 authorized to have the right to configure the stoppable floor information set 20, and the handheld terminal 160 can also sense the first Bluetooth signal broadcast by the first Bluetooth module 130 and establish a corresponding Bluetooth connection with the first Bluetooth module 130, thus data transmission therebetween is possible, for example, the first Bluetooth module 130 can send the obtained landing floor information to the handheld terminal 160 one by one; the elevator system 10 determines the landing floor information as the stoppable floor object corresponding to the elevator cabin 120 through the handheld terminal 160 which has established wireless connection with the first Bluetooth module 130, and builds the stoppable floor information set 20 corresponding to the elevator cabin 120 through the handheld terminal 160, wherein elements of the stoppable floor information set 20 are the stoppable floor objects, and the stoppable floor information set 20 can be understood as an aggregation of the stoppable floor objects. In this embodiment, the landing floor information m (m<n) can be received by and displayed on the handheld terminal 160, which facilitates the maintenance personnel 91 to determine the landing floor information m as stoppable floor object that can be used to build the stoppable floor information set 20, thus helping to ensure accuracy of the stoppable floor information set 20.

In another embodiment, the first Bluetooth module 130 itself can also automatically build the stoppable floor information set 20 corresponding to the elevator cabin 120 based on the obtained landing floor information, for example, all the landing floor information is used to build the stoppable floor information set 20; correspondingly, the first Bluetooth module 130 directly sends the stoppable floor information set 20 to the handheld terminal 160 with which it has established the Bluetooth connection, and the handheld terminal 160 is granted the corresponding right to verify the currently received stoppable floor information set 20, for example, to verify whether the elements in the stoppable floor information set 20 are correct. In the case that the elements are confirmed correct, the stoppable floor information set 20 is determined as the stoppable floor information set that can be used in the subsequent elevator calling process.

Still referring to FIG. 1 and FIG. 2, a storage end 290 can be provided corresponding to one or more elevator systems 10, for example, the storage end 290 can be provided remotely with respect to the elevator systems 10, and can be realized through a cloud server or the like. The storage end 290 can establish a wireless connection with the handheld terminal 160, thus sending or uploading the stoppable floor information set 20 to the storage end 290 will be very convenient.

The storage end 290 can store the stoppable floor information set 20 according to the corresponding elevator cabin 120, for example, the IDs of multiple elevator cabins 120 are respectively associated with multiple stored stoppable floor information sets 20. In this way, a certain elevator cabin 20 of the elevator system 10 is configured with a corresponding stoppable floor information set 20 at the storage end 290.

The storage end 290 can also establish a wireless connection with the personal mobile terminal 170, thus, very conveniently obtaining the stoppable floor information set 20. The storage end 290 can provide, in the form of a cloud server, the stoppable floor information set 20 corresponding to the elevator cabin 120 that can be downloaded and acquired by the personal mobile terminal 170. Therefore, when downloading and installing an elevator calling application component or scanning an ID (e.g. a QR code) of the corresponding elevator cabin 120 in the elevator landing station area, for example, the personal mobile terminal 170 can download and acquire the stoppable floor information set 20 corresponding to the ID of a certain elevator cabin 120 from the storage end 290, and then the personal mobile terminal 170 can automatically send the request of registering the destination floor to the wireless signal module (e.g. the first Bluetooth module 130) based on the accurate stoppable floor information set 20, thus avoiding sending the wrong request of destination floor.

The storage end 290 can be, but is not limited to, the cloud server. The stoppable floor information sets 20 of many elevator cabins of multiple elevator systems 290 are stored in one cloud server, which costs less. In still another specific embodiment, the storage end 290 can also be arranged in the elevator system 10, for example, in the wireless signal module (e.g. the first Bluetooth module 130 or the second Bluetooth module 150), and the personal mobile terminal 170 can obtain the corresponding stoppable floor information set 20 from the first Bluetooth module 130 or the second Bluetooth module 150 upon establishing a wireless connection with the wireless signal module.

It shall be understood that in other embodiments, the storage end 290 can also send, for example, an updated stoppable floor information set 20 (if the personal mobile terminal 170 has already stored the existing stoppable floor information set 20 of a certain elevator cabin 120) to the personal mobile terminal 170 by pushing way, so that the storage end 290 enables the personal mobile terminal 170 to download the stoppable floor information set 20.

In the elevator system 10 of the above example, after the installation of the elevator system 10, for example, the maintenance personnel 91 carries the handheld terminal 160 to enter the elevator cabin 120, and the elevator control device 190 controls the elevator cabin 120 to move in the elevator shaft 110 and land at each of the stoppable floors. In this way, the first Bluetooth module 130 and the handheld terminal 160 can automatically and accurately obtain each landing floor information, and the handheld terminal 160 does not need the maintenance personnel 91 to manually input the landing floor information, which avoids errors that are liable to occur in the manual input process. After the elevator cabin 120 has landed at all stoppable floors, all the landing floor information will have been obtained, and the handheld terminal 160 can automatically build the stoppable floor information set 20 corresponding to the elevator cabin 120 based on all the landing floor information and provide it to the storage end 290 for the passenger 92 to download. Therefore, each elevator cabin 120 can be accurately configured with a corresponding stoppable floor information set 20, which can avoid that the stoppable floor information set 20 contains wrong information of the actually non-landing floor (for example, if the maintenance personnel 91 manually inputs the stoppable floor information set 20 at the web page end, the stoppable floor information set 20 may contain the wrong information of the actually non-landing floor due to input errors). In addition, few operations are performed by the maintenance personnel 91, the labor cost is low, and requirements on operations of the maintenance personnel 91 are also low. Furthermore, when the personal mobile terminal 170 of the passenger 92 uses the accurate stoppable floor information set 20 for automatic elevator calling, the elevator calling problem caused by inconsistency between the floor information contained in the stoppable floor information set 20 and the actually landed floor can be avoided, thus greatly improving the passenger's experience in elevator calling.

It should be noted that the above process of configuring the stoppable floor information set 20 can be completed in one round-trip travel of the elevator cabin 120, or in multiple round-trip travels.

It shall be understood that in the above embodiment, the operations related to the configuration of the stoppable floor information set 20 performed by the first Bluetooth module 130 can also be performed alternatively by the second Bluetooth module 150, for example, the landing floor information is obtained and sent to the handheld terminal 160 by the second Bluetooth module 150; when it is realized by the second Bluetooth module 150, the maintenance personnel may need to come out of the elevator cabin 120 at each landing station to establish a Bluetooth connection with the second Bluetooth module 150, so the operation is less convenient.

In one embodiment, the personal mobile terminal 170 can be realized by a smart phone, a wearable smart device (such as a smart bracelet, etc.), a personal digital assistant (PAD), etc., and corresponding application components (such as APPs) can be installed on the personal mobile terminal 170 to realize the function of automatic elevator calling. The personal mobile terminal 170 may also be provided with a corresponding Bluetooth communication module, so as to be able to automatically establish Bluetooth connection with the first Bluetooth module 130 or the second Bluetooth module 150.

In one embodiment, as shown in FIG. 3, the first Bluetooth module 130 can be integrated on the destination floor registration control board inside the elevator cabin 120, which can be realized specifically through a Bluetooth processor 131, a memory 134, a Bluetooth antenna 133, etc. The Bluetooth antenna 133 can be used to receive and broadcast Bluetooth signals (for example, broadcast the first Bluetooth signal), a filter 132 can be arranged between the Bluetooth antenna 133 and Bluetooth processor 131 to filter Bluetooth signals, a corresponding program can be set or installed in the memory 134 to perform operations for realizing corresponding functions of the first Bluetooth module 130, and the memory 134 can also be provided with or store, for example, the universal unique identifier (UUID) of the first Bluetooth module 130 and/or the ID of the elevator cabin 120 where the first Bluetooth module 130 is located. The Bluetooth processor 131 of the first Bluetooth module 130 can specifically establish a corresponding communication connection with a RSL processor 139 of the destination floor registration control board in the elevator cabin 120 during operation, for example, a serial port connection can be established based on a Universal Asynchronous Receiver/Transmitter (UART). When the first Bluetooth module 130 is operating, the Bluetooth processor 131 shakes hand with the RSL processor 139 and continuously verifies the communication connection, so that the request of register the destination floor received by the first Bluetooth module 130 can be transmitted to the RSL processor 139 in real time for processing, and then sent to the elevator control device 190 in real time.

It will be understood that the second Bluetooth module 150 installed in the elevator landing station area can also be implemented by a structure similar to that of the first Bluetooth module 130.

In one embodiment, referring to FIG. 4, the handheld terminal 160 can be realized by, but is not limited to, a smart phone, a wearable smart device (such as a smart bracelet, etc.), a personal digital assistant (PAD), a portable computer, etc., and it includes a processor 161, a memory 162, a communication component 163 and an input/output component 164. For example, the input/output component 164 can be realized through a touch screen, which has areas 1641, 1642 and 1643 on a certain display interface. Area 1641 can be used to display in real time the landing floor information (e.g. floor 8), for example, received from the first Bluetooth module 130; area 1642 can be used to display the ID of the elevator cabin 120, so that the maintenance personnel 91 knows for which elevator cabin the stoppable floor information set is configured currently; area 1643 can form an input virtual key used to perform the operation of confirming the landing floor information or the stoppable floor information set, and the maintenance personnel 91 can click the virtual key to complete the operation of confirming, for example, if the floor "8" in the display area 1641 is consistent with the actually landed floor of the elevator cabin 120 currently, click the "OK" button to complete the operation of confirming. A corresponding program (such as an APP) can be provided or installed in the memory 134 of the handheld terminal 160, so that the processor 161 can execute the program and realize the corresponding functions of the handheld terminal 160, for example, automatically building or updating the stoppable floor information set 20, controlling display of the input/output component 164, controlling the communication component 163 to wirelessly send or upload the stoppable floor information set 20, etc. The communication component 163 can be, but is not limited to, a Bluetooth communication module.

It shall be noted that in some application scenarios, the actual stoppable floors of the elevator cabin 120 will change, for example, floor 2 is originally unstoppable but is changed into stoppable, in this case, it is necessary to update the existing stoppable floor information set 20 to obtain the changed accurate stoppable floor information set 20. The elevator system 10 of the above embodiment can also automatically update the stoppable floor information set 20, which has substantially the same principle as building a new stoppable floor information set 20. For example, the stoppable floor information set 20 of the corresponding elevator cabin 120 is also updated based on the landing floor information obtained by the first Bluetooth module 130. If the actual stoppable floors of the elevator cabin 120 changes, the first Bluetooth module 130 compares all the obtained landing floor information with the existing stoppable floor information set 20 to learn so as to determine or find out that a certain piece of obtained landing floor information does not correspond to any stoppable floor object in the existing or configured stoppable floor information set 20, or to determine or find out that a certain stoppable floor object in the existing stoppable floor information set 20 does not correspond to any of the landing floor information obtained by the first Bluetooth module 130. A machine learning algorithm, for example, may be installed in the first Bluetooth module 130 to monitor the change of the landing floor information relative to the existing or configured stoppable floor information set, thereby realize the above process. During updating, if a landing floor information does not correspond to the stoppable floor object of the existing stoppable floor information set, the landing floor information will be added as stoppable floor object into the existing stoppable floor information set through the first Bluetooth module 130 or the handheld terminal 160, thus forming the updated stoppable floor information set corresponding to the elevator cabin 120; if a certain stoppable floor object in the existing stoppable floor information set does not correspond to any of the landing floor information obtained by the first Bluetooth module 130, the stoppable floor object will be deleted from the existing stoppable floor information set by the first Bluetooth module 130 or the handheld terminal 160, thus forming the updated stoppable floor information set corresponding to the elevator cabin 120. In this way, the stoppable floor information set 20 at the storage end 290 can be updated in time to ensure that it is consistent with the actually stoppable floors of the elevator cabin 120.

In one embodiment, the stoppable floor information set includes a set of upward stoppable floors information and/or a set of downward stoppable floors information. The set of upward stoppable floors information can be used to register the destination floor when the personal mobile terminal 92 calls an elevator up, and the set of downward stoppable floors information can be used to register the destination floor when the personal mobile terminal 92 calls an elevator down. The configuration principle of the set of upward stoppable floors information or the set of downward stoppable floors information is basically the same as that of the stoppable floor information set. For example, the set of upward stoppable floors information/the set of downward stoppable floors information is obtained by the following process: firstly, the elevator cabin 120 is controlled by the elevator control device 190 to move upward/downward in the elevator shaft and to land at each upward/downward stoppable floor; secondly, the landing floor information is obtained by the first Bluetooth module 130, and the set of upward stoppable floors information/the set of downward stoppable floors information corresponding to the elevator cabin is configured based on the obtained landing floor information.

Figure 5:
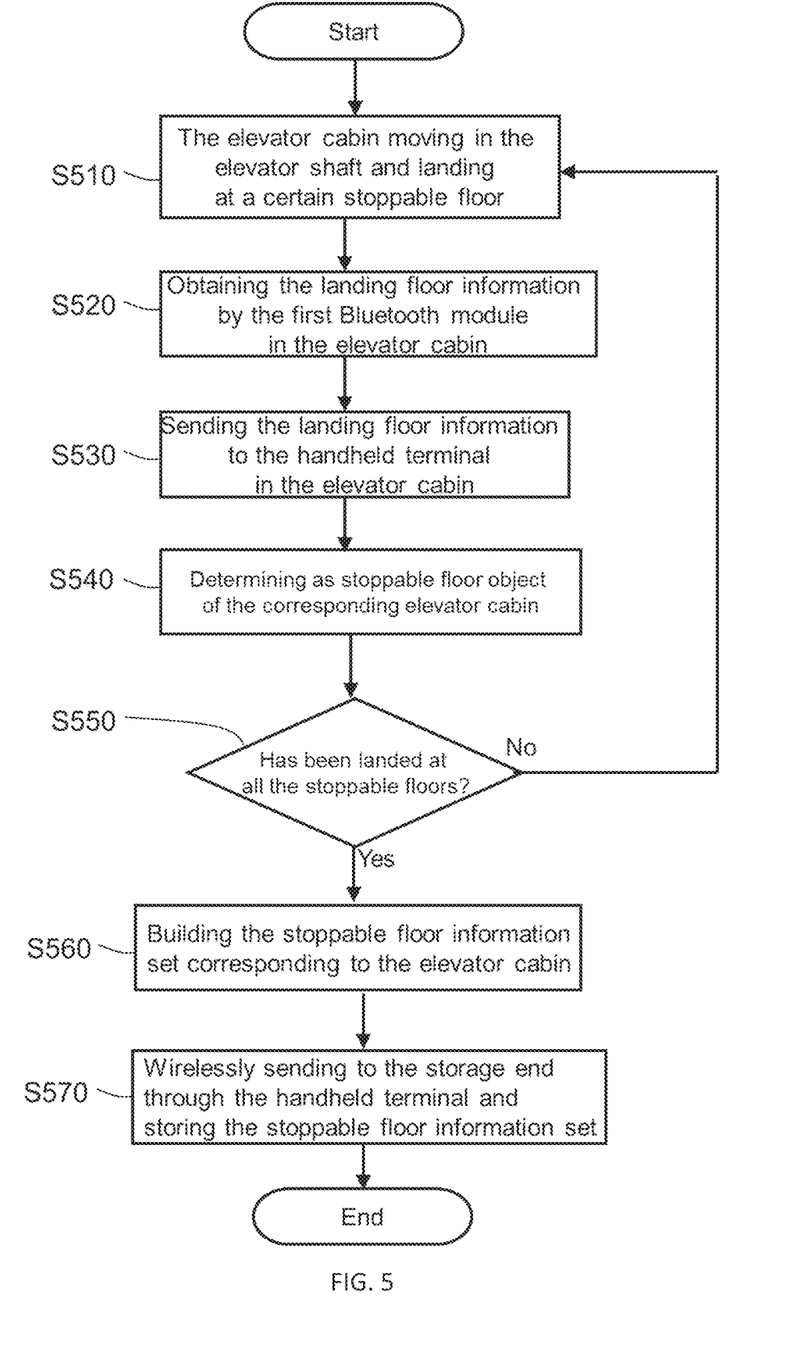
FIG. 5 is a flow chart of a method of configuring stoppable floor information set for an elevator cabin of an elevator system according to an embodiment of the present invention.

FIG. 5 shows a flow chart of a method of configuring a stoppable floor information set according to an embodiment of the present invention. The method of configuring a stoppable floor information set according to an embodiment of the present invention will be described below in combination with the examples of FIG. 1, FIG. 2 and FIG. 5.

Referring to FIG. 5, in step S510, the elevator cabin 120 moves in the elevator shaft 110 and lands at a certain stoppable floor; this step can be realized by the elevator control device 190, and the elevator control device 190 can determine the location information of each landing floor, i.e. the landing floor information.

In step S520, the wireless signal module (e.g. the first Bluetooth module 130 or the second Bluetooth module 150) of the elevator system 10 is used to obtain the landing floor information, specifically from the elevator control device 190.

In step S530, the landing floor information is sent to the handheld terminal 160 in the elevator cabin 120. In this step, transmission of the landing information can be realized by, for example, the first Bluetooth module 130. In other embodiments, this step can also be omitted if the stoppable floor information set 20 is to be updated and the landing floor information has not changed.

In step S540, the obtained landing floor information is determined as the stoppable floor object corresponding to elevator cabin 120. In this step, the determination operation can be performed by the input/output component 164 of the handheld terminal 160. Through this manual determination operation, the wrong landing floor information can be excluded from the stoppable floor information set 20.

In step S550, the elevator control device 190 determines whether a landing has been made at all the stoppable floors. If "no", return to step S510 to further collect stoppable floor objects of other floors until the result of determination is "yes", and then enter step S560.

In step S560, the stoppable floor information set corresponding to the elevator cabin 120 is built. In this step, the data set is built based on all the obtained stoppable floor objects, which can be automatically performed by the handheld terminal 160.

In step S570, the stoppable floor information set 20 is wirelessly sent to the storage end 290 through the handheld terminal 160, and the stoppable floor information set 20 is stored in the storage end 290, so that configuration of the stoppable floor information set 20 of the elevator cabin 120 can be completed.

The method of configuring the stoppable floor information set in the above embodiment can be implemented in the maintenance process after the installation of the elevator system 10, or in the maintenance process after the stoppable floors of the elevator cabin 120 have changed.

Figure 6:
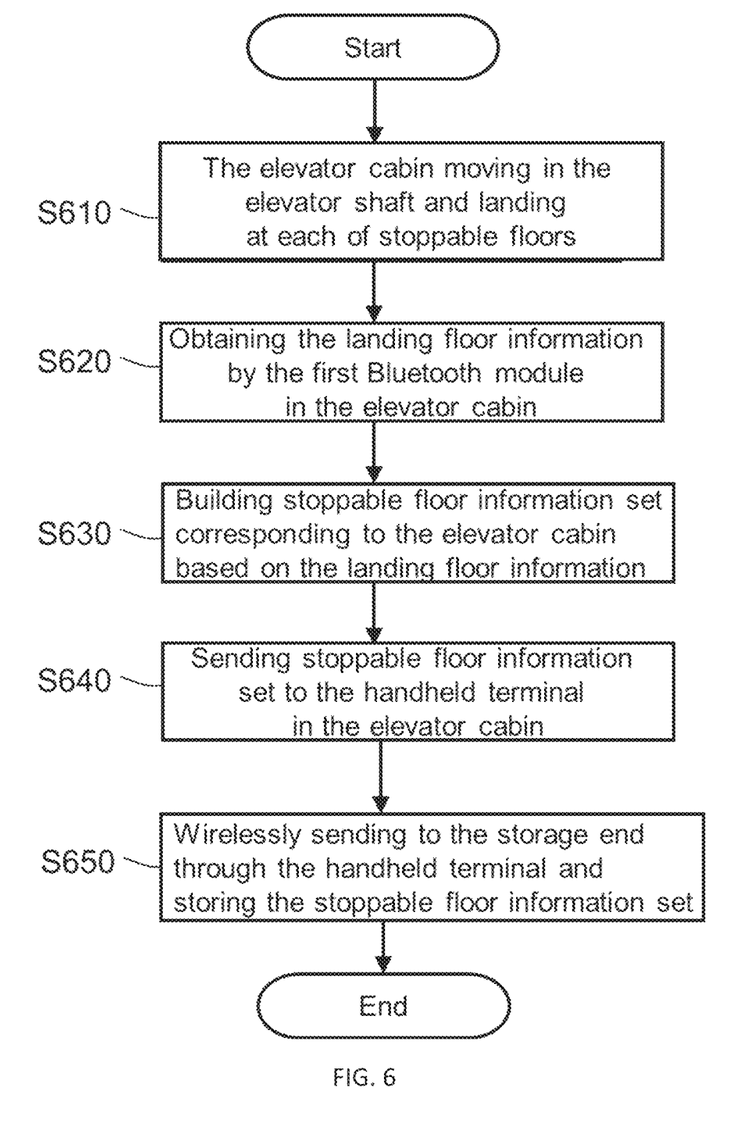
FIG. 6 is a flow chart of a method of configuring a stoppable floor information set for an elevator cabin of an elevator system according to another embodiment of the present invention.

FIG. 6 shows a flow chart of a method of configuring an stoppable floor information set according to another embodiment of the present invention. The method of configuring an stoppable floor information set according to an embodiment of the present invention will be described below in combination with the examples of FIG. 1, FIG. 2 and FIG. 6.

Referring to FIG. 6, in step S610, the elevator cabin 120 moves in the elevator shaft 110 and lands at each stoppable floor; this step can be realized by the elevator control device 190, which can determine the location information of each landing floor, i.e. the landing floor information. This step may, but is not limited to, be implemented in one round-trip travel of the elevator cabin 120.

In step S620, the wireless signal module (e.g. the first Bluetooth module 130 or the second Bluetooth module 150) of the elevator system 10 is used to obtain the landing floor information, specifically from the elevator control device 190.

In step S630, the stoppable floor information set corresponding to the elevator cabin 120 is built based on the landing floor information. In this step, the data set is built based on all the obtained landing floor information, which can be automatically performed by, for example, the first Bluetooth module 130.

In step S640, the stoppable floor information set is sent to the handheld terminal 160 in the elevator cabin 120. In this step, transmission of the stoppable floor information set can be realized by, for example, the first Bluetooth module 130. In other embodiments, this step can also be omitted if the stoppable floor information set 20 is to be updated and the stoppable floor information set has not changed.

In this step, the handheld terminal 160 can be used to display the received stoppable floor information set and receive instruction inputs of the maintenance personnel so as to determine whether the stoppable floor information set is correct, thereby ensuring consistency between the stoppable floor information set 20 and the actually stoppable floors.

In step S650, the stoppable floor information set 20 is wirelessly transmitted to the storage end 290 through the handheld terminal 160, and the stoppable floor information set 20 is stored in the storage end 290, so that configuration of the stoppable floor information set 20 of the elevator cabin 120 can be completed.

Compared to the method of configuring the stoppable floor information set in the embodiment of FIG. 5, the method in the example of FIG. 6 is automatically implemented in the first Bluetooth module 130, and the operation of the maintenance personnel 91 is simpler.

Figure 7:
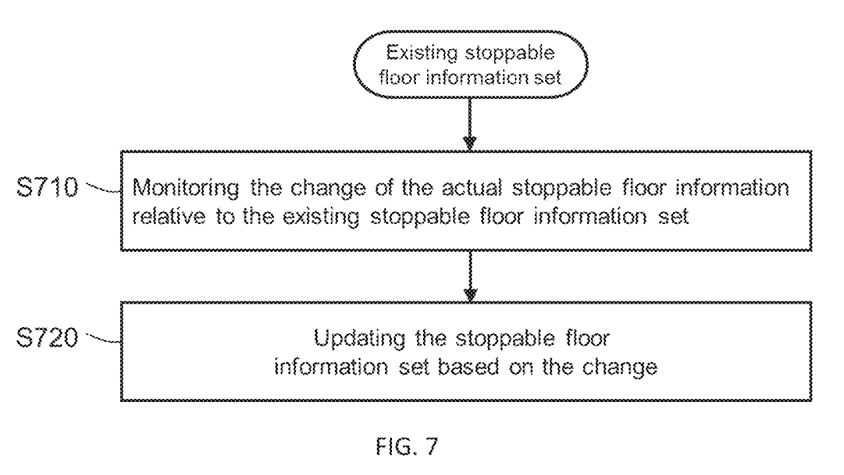
FIG. 7 is a flow chart of a method of configuring a stoppable floor information set for an elevator cabin of an elevator system according to still another embodiment of the present invention.

FIG. 7 is a flow chart of a method of configuring an stoppable floor information set according to still another embodiment of the present invention. The method of this embodiment is mainly used to update the existing or configured stoppable floor information set 20, so as to ensure that the stoppable floor information set 20 can be updated in time when the actually stoppable floors have changed.

Referring to FIG. 7, in step S710, a machine learning algorithm is used to monitor the change of the actual stoppable floor information relative to the existing or configured stoppable floor information set.

For example, if the actual stoppable floors of the elevator cabin 120 change, the first Bluetooth module 130 compares all the obtained landing floor information (e.g. all landing floor information of a certain period of time at present obtained by statistical learning) with the existing stoppable floor information set 20 to learn so as to determine or find out that a certain piece of obtained landing floor information does not correspond to any stoppable floor object in the existing stoppable floor information set 20, or to determine or find out that a certain stoppable floor object in the existing stoppable floor information set does not correspond to any of the landing floor information obtained by the first Bluetooth module 130.

In step S720, the stoppable floor information set 20 is updated based on the change.

Specifically, if the landing floor information does not correspond to the stoppable floor object of the existing stoppable floor information set, the landing floor information will be added as stoppable floor object into the existing stoppable floor information set through the first Bluetooth module 130 or the handheld terminal 160, thus forming the updated stoppable floor information set corresponding to the elevator cabin 120; if a certain stoppable floor object in the existing stoppable floor information set does not correspond to any of the landing floor information obtained by the first Bluetooth module 130, the stoppable floor object will be deleted from the existing stoppable floor information set by the first Bluetooth module 130 or the handheld terminal 160, thus forming the updated stoppable floor information set 20 corresponding to the elevator cabin 120.

In this way, the stoppable floor information set 20 at the storage end 290 can be updated in time to ensure that it is consistent with the actually stoppable floors of the elevator cabin 120.

Therefore, the method of configuring the stoppable floor information set illustrated in FIGS. 5 to 7 above can accurately configure the corresponding stoppable floor information set for a certain elevator cabin, and the operations thereof are simple.

It shall be noted that the "stoppable floor information set" mentioned in the embodiments of the present invention can be a set of data representing floor information, which can be a tangible and clearly recorded data set, or a virtual data set of invisibly associated elements. For example, multiple elements are associated to one another through the elevator cabin ID but are not clearly recorded as a set.

It should be noted that the handheld terminal 160 in the above embodiments of the present invention can be implemented by computer program instructions, for example, through dedicated APPs, and these computer program instructions can be provided to processors of general purpose computers, dedicated computers or other programmable data processing devices to constitute the handheld terminal 160 of the embodiments of the present invention, besides, units or components for realizing functions/operations specified in the flow charts and/or blocks and/or one or more flow block diagrams can be created by said instructions that are executed by the processors of the computers or other programmable data processing devices.

Likewise, the wireless signal module (e.g. first Bluetooth module 130) of the elevator system 10 in the above embodiments of the present invention can be implemented by computer program instructions, for example, through dedicated applications, and these computer program instructions can be provided to processors to perform the corresponding operations of the first Bluetooth module 130 in an embodiment of the present invention, besides, units or components for realizing functions/operations specified in the flow charts and/or blocks and/or one or more flow block diagrams can be created by said instructions that are executed by the processors of the computers or other programmable data processing devices.

Moreover, said computer program instructions can be stored in a computer-readable memory and can instruct the computers or other programmable processors to achieve functions in a specific way, so that these instructions stored in the computer-readable memory form a product that includes instruction components for realizing functions/operations specified in one or more blocks of the flow chart and/or block diagram.

It shall also be noted that in some optional implementations, the functions/operations shown in the blocks may not take place in the order shown in the flow chart. For example, two blocks shown in turn may actually be concurrently implemented or they may be implemented in an inverted order sometimes, depending on the functions/operations involved.

It shall be noted that the elements disclosed and depicted herein (including flow charts and block diagrams in the drawings) refer to the logical boundaries between the elements. However, according to software or hardware engineering practice, the described elements and their functions can be implemented on a machine through a computer-executable medium, which has a processor capable of executing program instructions stored thereon, said program instructions acting as a monolithic software structure, an independent software module, or a module using external programs, codes, services, etc., or as any combination thereof, and all of these implementation schemes may fall within the scope of the present disclosure.

Although different non-restrictive embodiments have specifically described components, the embodiments of the present invention are not limited to these specific combinations. Some of the components or features from any non-restrictive embodiment may be combined with components or features from any other non-restrictive embodiment.

Although specific orders of steps are shown, disclosed and required, it should be understood that the steps can be performed, separated or combined in any order, unless otherwise specified, and will still benefit from the present disclosure.

The foregoing descriptions are illustrative rather than restrictive. Various non-restrictive embodiments are disclosed herein, however, those skilled in the art will understand that, according to the above teachings, various modifications and changes will fall within the scope of the appended claims. Therefore, it will be understood that disclosure other than the specific disclosure may be implemented within the scope of the appended claims. For this reason, the appended claims should be read to determine the true scope and content.

What is claimed is:

1. An elevator system, comprising:
an elevator cabin;
an elevator control device configured to at least control the elevator cabin to move in an elevator shaft and land at each stoppable floor; and
a wireless signal module configured to wirelessly receive a request of registering a destination floor from a passenger's personal mobile terminal and send a corresponding destination floor of the elevator cabin to the elevator control device based on the request of registering the destination floor; wherein
the wireless signal module is further configured to obtain landing floor information corresponding to the elevator cabin from the elevator system, and the elevator system configures a stoppable floor information set corresponding to the elevator cabin based on the obtained landing floor information through a handheld terminal and/or the wireless signal module, the stoppable floor information set indicating landing floors at which the elevator cabin can stop;
wherein the wireless signal module is further configured to automatically build the stoppable floor information set corresponding to the elevator cabin based on the obtained landing floor information.

2. The elevator system according to claim 1, wherein said elevator system is provided with a corresponding storage end which stores the stoppable floor information set corresponding to the elevator cabin.

3. The elevator system according to claim 2, wherein the storage end provides the stoppable floor information set corresponding to the elevator cabin which can be downloaded and acquired by the personal mobile terminal;
wherein the personal mobile terminal is configured to sense wireless signals broadcast by the wireless signal module and establish a wireless connection with the wireless signal module, and to automatically send the request of registering a destination floor to the wireless signal module based on the stoppable floor information set.

4. The elevator system according to claim 1, wherein wireless signal module is further configured to send the landing floor information to the handheld terminal;
the elevator system determines the landing floor information as stoppable floor object corresponding to the elevator cabin through the handheld terminal which can establish wireless connection with the wireless signal module, and builds the stoppable floor information set corresponding to the elevator cabin through the handheld terminal, wherein an element of the stoppable floor information set includes the stoppable floor object.

5. The elevator system according to claim 4, wherein the elevator system wirelessly sends the stoppable floor information set to the storage end through the handheld terminal which has established wireless connection with the wireless signal module.

6. The elevator system according to claim 1, wherein the wireless signal module is further configured to send the stoppable floor information set to the handheld terminal; wherein the elevator system wirelessly sends the stoppable floor information set to the storage end through the handheld terminal.

7. The elevator system according to claim 2, wherein the storage end is a cloud server or is arranged in the wireless signal module.

8. The elevator system according to claim 1, wherein said elevator system comprises:
a first Bluetooth module installed in the elevator cabin, which is used for broadcasting a first Bluetooth signal and automatically establishing a first Bluetooth connection with the personal mobile terminal based on the first Bluetooth signal, and receiving the request of registering the destination floor sent from the personal mobile terminal upon establishment of the first Bluetooth connection; and
a second Bluetooth module installed in a landing station area, which is used for broadcasting a second Bluetooth signal and automatically establishing a second Bluetooth connection with the personal mobile terminal based on the second Bluetooth signal, and receiving an elevator call request about an elevator moving direction sent from the personal mobile terminal upon establishment of the second Bluetooth connection;
wherein the wireless signal module is the first Bluetooth module.

9. The elevator system according to claim 1, wherein the wireless signal module is further configured to monitor changes of the information of actual stoppable floors of the elevator cabin compared to the existing or configured stoppable floor information set.

10. A handheld terminal, comprising a memory, a processor and a computer program stored in the memory and executable on the processor, wherein the processor implements the following steps when executing the computer program:
receiving landing floor information from a wireless signal module wirelessly connected with the handheld terminal, wherein the landing floor information is corresponds to a landing floor when an elevator cabin lands at each stoppable floor;
determining the landing floor information as a stoppable floor object of the corresponding elevator cabin;
building a stoppable floor information set corresponding to the elevator cabin, wherein an element of the stoppable floor information set includes the stoppable floor object, the stoppable floor information set indicating landing floors at which the elevator cabin can stop; and
sending the stoppable floor information set wirelessly to a storage end.

11. A method of configuring a stoppable floor information set for an elevator cabin of an elevator system, which includes the steps of:
in the process that the elevator cabin moves in an elevator shaft and lands at each stoppable floor, obtaining the corresponding landing floor information through a wireless signal module of the elevator system; and
configuring the stoppable floor information set corresponding to the elevator cabin based on the obtained landing floor information, wherein the stoppable floor information set corresponding to the elevator cabin is automatically built by a wireless signal module of the elevator system, the stoppable floor information set indicating landing floors at which the elevator cabin can stop;
wherein, the wireless signal module is configured to wirelessly receive a request of registering a destination floor from a passenger and send a corresponding destination floor of the elevator cabin to the elevator system based on the request of registering the destination floor.

12. The method according to claim 11, wherein the step of configuring the stoppable floor information set corresponding to the elevator cabin includes updating the stoppable floor information set corresponding to the elevator cabin based on the landing floor information.

13. The method according to claim 12, wherein an element of the stoppable floor information set includes the stoppable floor object corresponding to the landing floor information;
in the step of configuring the stoppable floor information set corresponding to the elevator cabin,
if the landing floor information does not correspond to the stoppable floor object of the existing stoppable floor information set, it will be added as stoppable floor object into the existing stoppable floor information set so as to form an updated stoppable floor information set corresponding to the elevator cabin.

14. The method according to claim 12, wherein the element of the stoppable floor information set includes the stoppable floor object corresponding to the landing floor information;
in the step of configuring the stoppable floor information set corresponding to the elevator cabin,
after the elevator cabin has landed at each stoppable floor, if a certain stoppable floor object in the existing stoppable floor information set could not correspond to any of the landing floor information obtained by the wireless signal module, it will be deleted from the existing stoppable floor information set so as to form an updated stoppable floor information set corresponding to the elevator cabin.

15. The method according to claim 11, wherein the step of configuring the stoppable floor information set corresponding to the elevator cabin includes:
sending the landing floor information to the handheld terminal through the wireless signal module of the elevator system;
determining the landing floor information as the stoppable floor object corresponding to the elevator cabin through the handheld terminal;
building the stoppable floor information set corresponding to the elevator cabin through the handheld terminal, wherein the element of the stoppable floor information set includes the stoppable floor object; and
sending the stoppable floor information set wirelessly to the storage end through the handheld terminal.

16. The method according to claim 11, wherein the step of configuring the stoppable floor information set corresponding to the elevator cabin includes:
sending the stoppable floor information set to the handheld terminal through the wireless signal module of the elevator system; and
sending the stoppable floor information set wirelessly to the storage end through the handheld terminal.

17. The method according to claim 15, wherein the storage end stores the stoppable floor information set corresponding to the elevator cabin, and provides the stoppable floor information set corresponding to the elevator cabin which can be downloaded and acquired by the personal mobile terminal;
- wherein, the personal mobile terminal is configured to sense wireless signals broadcast by the wireless signal module and establish a wireless connection with the wireless signal module, and to automatically send the request of registering the destination floor to the wireless signal module based on the stoppable floor information set.

18. The method according to claim 15, wherein the storage end is a cloud server or is arranged in the wireless signal module.

19. The method according to claim 11, wherein the stoppable floor information set includes a set of upward stoppable floors information and/or a set of downward stoppable floors information;
- the set of upward stoppable floors information/set of downward stoppable floors information is obtained through the following:
- the elevator cabin moving upward/downward in the elevator shaft and landing at each upward/downward stoppable floor;
- obtaining the corresponding landing floor information by the wireless signal module of the elevator system; and
- configuring the set of upward stoppable floors information/the set of downward stoppable floors information corresponding to the elevator cabin based on the obtained landing floor information.

* * * * *